April 17, 1962 M. E. NOWAK 3,029,905
BRAKE MECHANISM
Filed April 28, 1960 2 Sheets-Sheet 1

INVENTOR.
MARTIN E. NOWAK
BY
Victor J. Evans & Co.
ATTORNEYS

April 17, 1962  M. E. NOWAK  3,029,905
BRAKE MECHANISM
Filed April 28, 1960  2 Sheets-Sheet 2
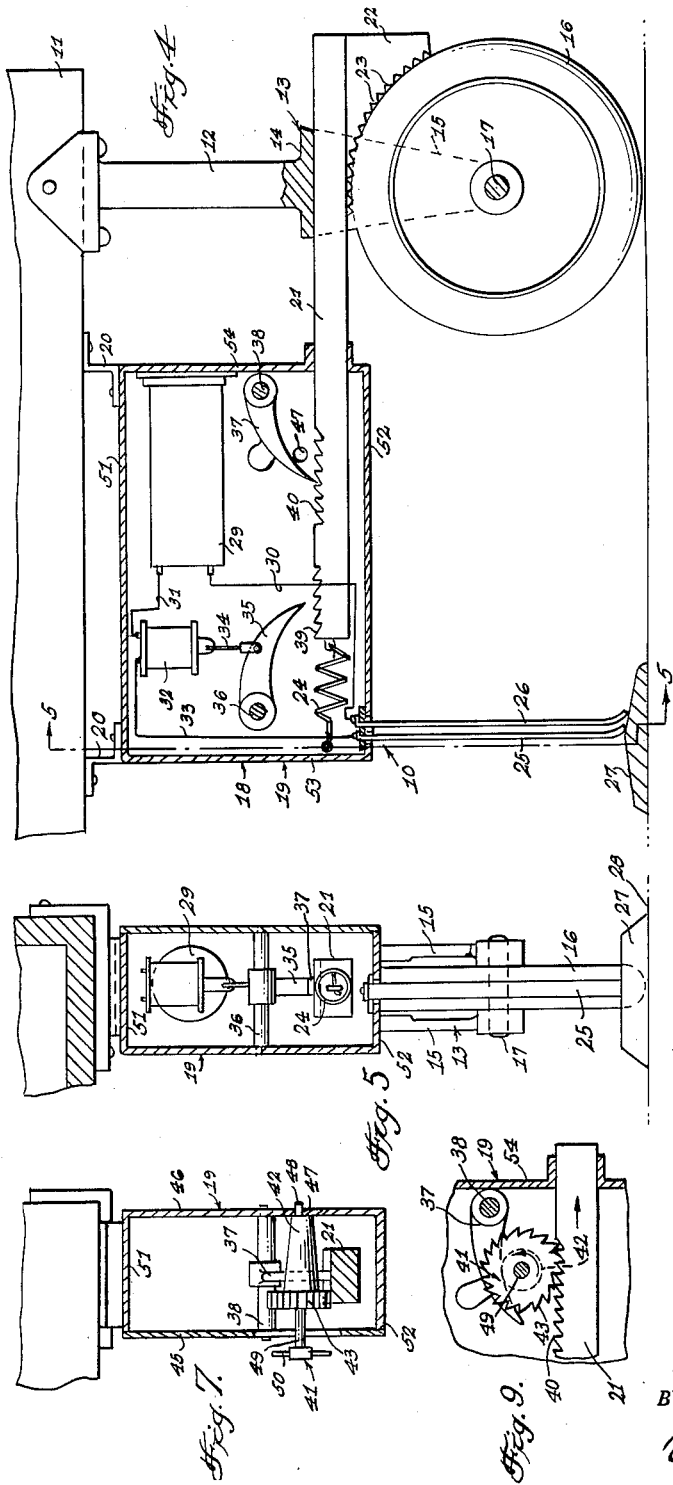
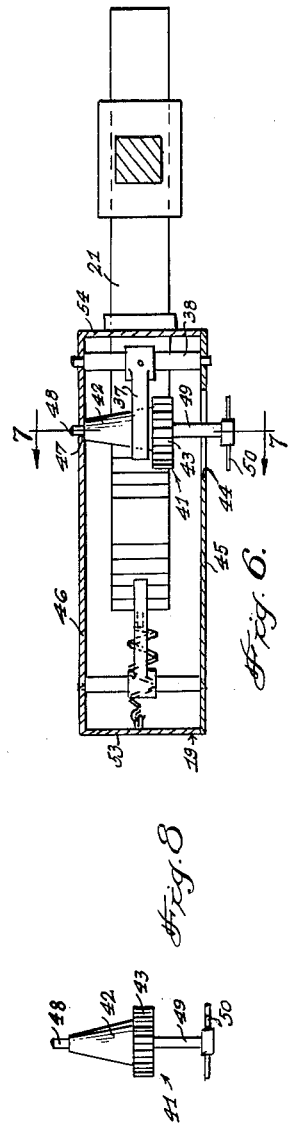
INVENTOR.
MARTIN E. NOWAK
BY
Victor J. Evans & Co.
ATTORNEYS

United States Patent Office 3,029,905
Patented Apr. 17, 1962

3,029,905
BRAKE MECHANISM
Martin E. Nowak, Maspeth, N.Y.
Filed Apr. 28, 1960, Ser. No. 25,259
2 Claims. (Cl. 188—111)

This invention relates to a mobile or wheeled unit, and more particularly to a brake mechanism for such a mobile unit.

The object of the invention is to provide a brake mechanism which is adapted to be automatically actuated when the wheeled member reaches a particular area or location.

Another object of the invention is to provide a brake mechanism for a mobile unit such as a shopping cart and wherein the brake mechanism is constructed so that for example in the event a shopper attempts to remove a shopping cart from the vicinity of a supermarket or other area, contact members will be automatically engaged by feelers on the cart so as to automatically actuate the brake mechanism which will have the effect of preventing the cart from being moved out of the particular area so that for example theft or accidental removal of the cart is prevented, and wherein the brake mechanism can only be released by the insertion of the proper key therein.

A further object of the invention is to provide a brake mechanism which is extremely simple and inexpensive to manufacture.

Other objects and advantages will be apparent during the course of the following description.

In the accompanying drawings, forming a part of this application, and in which like numerals are used to designate like parts throughout the same:

FIGURE 4 is a view similar to FIGURE 1 but showing the parts in a different position and showing the wheel engaged by the wedge so as to lock the wheel which prevents further movement of the cart.

FIGURE 5 is a sectional view taken on the line 5—5 of FIGURE 4.

FIGURE 6 is a horizontal sectional view taken through the brake mechanism.

FIGURE 7 is a vertical sectional view showing the key inserted in the housing for releasing the brake.

FIGURE 8 is a plan view of the key per se.

FIGURE 9 is a fragmentary sectional view showing the key inserted and the gear on the key in engagement with the teeth on the bar.

Figure 1:
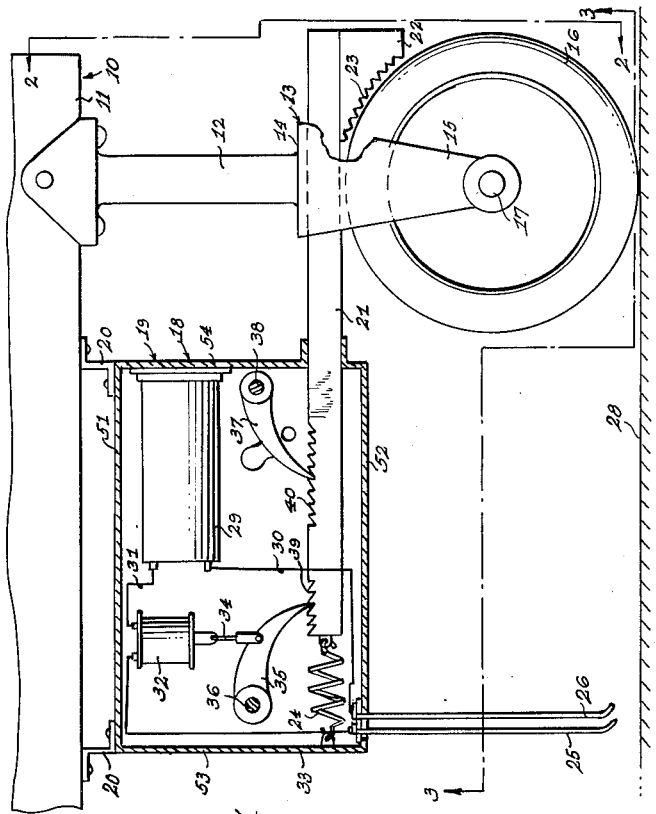
FIGURE 1 is a side elevational view illustrating the brake mechanism of the present invention, and with parts broken away and in section, and showing the positions of the parts when the brake is off which permits the cart or other member to be readily moved as desired.
Figure 2:
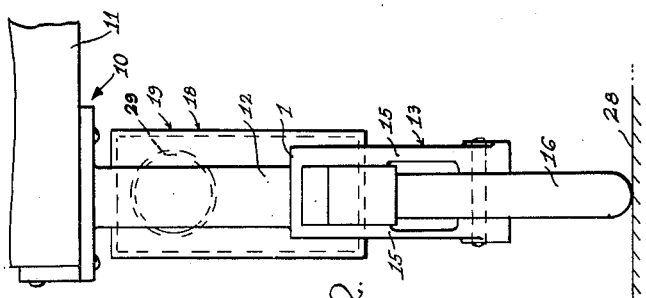
FIGURE 2 is an end elevational view, taken generally on the line 2—2 of FIGURE 1.
Figure 3:
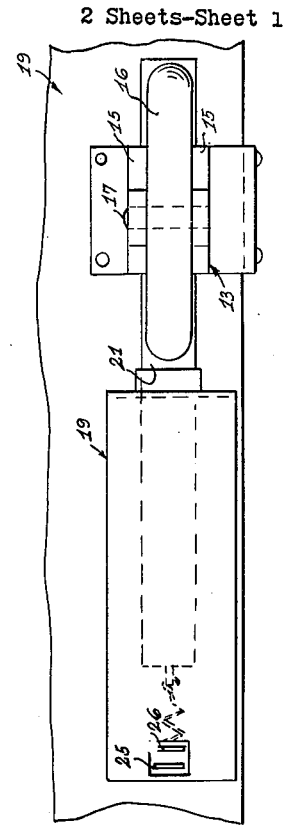
FIGURE 3 is a bottom plan view taken generally on the line 3—3 of FIGURE 1.

Referring in detail to the drawings, the numeral 10 indicates a mobile unit which may be a shopping cart or the like, and the unit 10 includes a body portion 11 which may have any desired configuration or formation, and depending from the body portion 11 and secured thereto is a post 12 which has a yoke 13 on the lower end thereof. The yoke 13 is shaped to include a horizontally disposed top portion 14 as well as spaced parallel vertically disposed side portions 15, and the number 16 indicates a wheel which is journaled between the side portions 15 on an axle 17.

According to the present invention the wheeled or mobile unit 10 is provided with a brake mechanism 18 which embodies a hollow housing 19 that may be mounted or secured beneath the body portion 11, as for example by means of brackets 20, FIGURE 1.

The numeral 21 indicates a movable bar which has a portion thereof projecting into the housing 19, and the bar 21 extends through the upper portion of the yoke 13, and the numeral 22 indicates a wedge on a lower end portion of the bar 21, and the wedge 22 is provided with teeth 23 which are mounted for movement into and out of engagement with the wheel 16 as the bar 21 is moved. The numeral 24 indicates a resilient means or coil spring which is arranged within the housing 19, and the coil spring 24 is connected to an end of the bar 21.

Depending from the housing 19 is a pair of spaced apart feelers or arms 25 and 26, and the lower ends of these feelers 25 and 26 are adapted to selectively engage a contact member 27 which may be arranged in a desired portion of a pavement or other horizontal surface 28.

The brake mechanism includes an electrical circuit which embodies a source of electrical energy such as the battery 29 that is arranged within the housing 19, and a conductor or wire 30 serves to electrically connect the feeler 26 to the battery 29. The numeral 32 indicates a solenoid which is electrically connected to the battery 29 by means of a connector 31, and a conductor 33 connects the solenoid 32 to the other feeler 25. Linkage 34 serves to connect the solenoid 32 to a first ratchet finger 35, and the ratchet 35 is pivotally mounted on a pin 36, FIGURE 1. In addition to the first ratchet finger 35, there is provided a second ratchet finger 37 and the ratchet finger 37 is mounted on a pivot pin 38. The upper surface of the movable bar 21 is provided with first and second groups of teeth 39 and 40, and as shown in FIGURES 1 and 4 for example, the teeth 39 are inclined and in one direction while the teeth 40 are inclined in the opposite direction. The teeth 39 are adapted to be selectively engaged by the pointed end of the first ratchet finger 35, while the teeth 40 are adapted to be selectively engaged by the pointed end of the other ratchet finger 37.

There is further provided a key which is indicated generally by the numeral 41, FIGURE 8, and the key 41 includes a tapered or conical section 42 as well as a cylindrical gear section 43, and the key 41 is adapted to be selectively engaged or inserted through an opening 44 in a side wall 45 of the housing 19. The housing 19 further includes a side wall 46 which is provided with an aperture 47 whereby the tip 48 of the key 41 can engage the aperture 47 in order to help insure that the key will be in its proper aligned position. As shown in the drawings, the key 41 further includes a stem or shank 49 which has a manually engageable handle portion 50 thereon. The gear section 43 of the key 41 is adapted to engage the teeth 40 of the bar 21, and the tapered section 42 of the key is adapted to engage the lower surface of the ratchet finger 37 in order to selectively raise the ratchet finger 37 and shift the bar 21 from left to right as for example from the position shown in FIGURE 4 to the postion shown in FIGURE 1, in order to release the brake mechanism by moving the wedge 22 away from the wheel 16.

The housing 19 which is hollow, may have a rectangular shape in cross section and as shown in the drawings embodies horizontal disposed top and bottom walls 51 and 52, as well as spaced parallel vertically disposed end walls 53 and 54.

From the foregoing, it is apparent that there has been provided a brake mechanism which can be used on different types of mobile units, as for example it can be used in conjunction with and mounted on a shopping cart such as the shopping carts which are used in supermarkets by shoppers or the like. With the parts arranged as shown in the drawings, it will be seen that normally the parts are in the position as shown in FIGURE 1 so that the wheel 16 is free to rotate whereby the cart or other unit 10 can bemoved from place to place as desired along a surface such as the surface 28. It will be seen that with the parts in the position in FIGURE 1, the pointed end of the ratchet finger 35 engages the teeth 39 of the bar 21 so as to maintain the bar 21 in the position of FIGURE 1 whereby the teeth 23 of the wedge 22 will be out of engagement with the wheel 16 so that there is no interference with rotation or movement of the wheel 16 whereby the cart can be moved from place to place as desired. However, when the cart is moved out of a prescribed area, as for example when a person attempts to wrongfully remove the cart from the vicinity of the supermarket, the feelers 25 and 26 will engage the contact member 27 which is made of a suitable material such as a metal that conducts electricity, and when the lower ends of the feelers 25 and 26 engage the contact member 27 as shown in FIGURE 4, the electrical circuit will be completed from the battery 29 through the feelers 25 and 26, to the solenoid 32. This will cause the solenoid 32 to be actuated so that the linkage 34 will be moved upwardly to thereby raise the ratchet finger 35 from the position shown in FIGURE 1 to the position shown in FIGURE 4 and with the ratchet finger 35 moved upwardly out of engagement with the teeth 39, the coil spring 24 will pull the bar 21 inwardly into the housing 19. This inward movement of the bar 21 will cause the wedge 22 to move towards the wheel 16 so that the teeth 23 will bear against the wheel 16 in order to prevent further rotation of the wheel so that the unit 10 will be locked and the brake will be on whereby further movement will be prevented. It will be seen that as shown in FIGURE 1 the pointed end of the ratchet finger 37 will engage the teeth 40 so as to maintain the bar 21 in its retracted position in the housing 19, whereby the brake cannot be released by unauthorized persons or the like.

To release or reset the brake mechanism, it is only necessary to insert the key 41 into the opening 44 in the side wall 45 of the housing so that the tapered or conical section 42 of the key 41 will engage the lower surface of the ratchet finger 37, and the teeth or gear section 43 will engage the teeth 40 of the bar 21. Then, the key 41 is rotated or turned in a counterclockwise direction by means of the handle 50 so that the gear section 43 will mesh with the teeth 40 and at the same time, the conical section 42 will engage beneath the ratchet finger 37 so as to lift the ratchet finger 37 whereby the gear section 43 will be free to engage the teeth 40 and thus shift the bar 21 from left to right in FIGURE 4 so that the parts can be moved from the position shown in FIGURE 4 back to the position shown in FIGURE 1 whereby the cart or mobile unit can then be used again in the normal manner for any desired purpose.

While the present invention has been described for use in connection primarily with a shopping cart, it is to be understood that the brake mechanism of the present invention is applicable to various other types of mobile units.

The parts can be made of any suitable material and in different shapes and sizes.

Minor changes in shape, size and rearrangement of details coming within the field of invention claimed may be resorted to in actual practice, if desired.

What is claimed is:

1. A movable unit comprising a member having a body portion, a vertically disposed post depending from said body portion and said post having a yoke on its lower end, a wheel journaled in said yoke, a hollow housing mounted below said body portion, a movable bar extending into said housing and said bar projecting through said yoke and having a toothed wedge thereon for selectively engaging said wheel, first and second groups of teeth on said bar, said first and second groups of teeth being angled in opposite directions relative to each other, resilient means arranged in said housing and connected to said bar for normally urging the bar inwardly relative to the housing; first and second ratchet fingers pivotally mounted in said housing for normally and selectively engaging said teeth, a pair of feelers depending from said housing, an electrical circuit embodying a source of electrical energy connected to one of said feelers, a solenoid electrically connected to the other feeler and said solenoid being also electrically connected to said source of electrical energy, link means connecting said solenoid to said first ratchet finger for moving said finger from its said normal engagement with said teeth, means independent from said unit for completing said circuit when said feelers are brought into proximity therewith for moving said first finger; key means for selectively moving said second ratchet finger and for moving said bar, said key means embodying a key member adjusted to be inserted in said housing and said key member including a cone-shaped section adapted to engage said second ratchet finger, a gear section adapted to engage said second group of teeth on said bar, and said key member also embodying a shank which has a handle thereon.

2. A movable unit comprising a member having a body portion, a vertically disposed post depending from said body portion and said post having a yoke on its lower end, a wheel journaled in said yoke, a hollow housing mounted below said body portion, a movable bar extending into said housing and said bar projecting through said yoke and having a toothed wedge thereon for selectively engaging said wheel, first and second groups of teeth on said bar, said first and second groups of teeth being angled in opposite directions relative to each other, resilient means connected to said bar; first and second ratchet fingers pivotally mounted in said housing for normally and selectively engaging said teeth, a pair of feelers depending from said housing, an electrical circuit embodying a source of electrical energy connected to one of said feelers, a solenoid electrically connected to the other feeler and said solenoid being also electrically connected to said source of electrical energy, link means connecting said solenoid to said first ratchet finger for moving said finger from its said normal engagement with said teeth, means independent from said unit for completing said circuit when said feelers are brought into proximity therewith for moving said first finger; key means for selectively moving said second ratchet finger and for moving said bar, said key means embodying a key member adjusted to be inserted in said housing and said key member including a cone-shaped section adapted to engage said second ratchet finger, a gear section adapted to engage said second group of teeth on said bar, and said key member also embodying a shank which has a handle thereon, said resilient means comprising a coil spring mounted in said housing for normally biasing the bar inwardly relative to the housing, said coil spring having one end connected to said bar and its other end anchored to said housing.

References Cited in the file of this patent

UNITED STATES PATENTS

| | | |
|---|---|---|
| 1,496,548 | Knight | June 3, 1924 |
| 1,804,773 | Hubbell | May 12, 1931 |
| 2,093,185 | Bieber | Sept. 14, 1937 |
| 2,218,910 | Hill | Oct. 22, 1940 |
| 2,734,590 | Hays | Feb. 14, 1956 |
| 2,828,833 | Civello | Apr. 1, 1958 |